US012222496B2

(12) United States Patent
Katsumata et al.

(10) Patent No.: US 12,222,496 B2
(45) Date of Patent: Feb. 11, 2025

(54) VEHICLE DISPLAY DEVICE

(71) Applicant: Yazaki Corporation, Tokyo (JP)

(72) Inventors: Yasuhiro Katsumata, Shizuoka (JP);
Yuki Miyoshi, Shizuoka (JP);
Katsuyoshi Itahana, Shizuoka (JP);
Takuya Ishigami, Shizuoka (JP);
Takayuki Mizushima, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 562 days.

(21) Appl. No.: 17/714,122

(22) Filed: Apr. 5, 2022

(65) Prior Publication Data

US 2022/0326515 A1 Oct. 13, 2022

(30) Foreign Application Priority Data

Apr. 7, 2021 (JP) ................................. 2021-065142

(51) Int. Cl.
*G02B 27/01* (2006.01)

(52) U.S. Cl.
CPC ...... *G02B 27/01* (2013.01); *G02B 2027/0141* (2013.01)

(58) Field of Classification Search
CPC .. G02B 27/01; G02B 27/017; G02B 27/0101; G02B 27/0149; G02B 27/0172; G02B 27/0178; G02B 2027/0141; G02B 2027/0161; B60K 35/00; B60K 35/23; B60K 35/29; B60K 35/50; B60K 35/85; G02F 1/133314; G02F 1/133317; G02F 1/13332; G02F 1/133328; G02F 1/133388
See application file for complete search history.

(56) References Cited

U.S. PATENT DOCUMENTS

| 10,114,219 | B2 | 10/2018 | Yagi et al. | |
| 2017/0115493 | A1* | 4/2017 | Aono | G02B 26/0816 |
| 2018/0059417 | A1* | 3/2018 | Furusawa | G02B 27/01 |
| 2021/0215934 | A1* | 7/2021 | Mizuochi | G02B 27/0149 |

FOREIGN PATENT DOCUMENTS

JP 2018-120807 A 8/2018

* cited by examiner

*Primary Examiner* — Sultan Chowdhury
(74) *Attorney, Agent, or Firm* — KENEALY VAIDYA LLP

(57) ABSTRACT

In a vehicle display device, a locking mechanism has a first support part that supports a first end of a display panel and a second support part located at a position relatively different from the first support part. The second support part has a pair of urging portions that urge the display panel in a support state, and a first receiving portion that receives a lower surface of a second end of the display panel. Each of the urging portions is formed curving in an S shape when viewed from the optical axis direction, and a distal end portion formed at an end opposite to the fixed end portion has a second receiving portion that protrudes from an abutting surface toward the display panel and interposes the second end of the display panel between the second receiving portion and the first receiving portion, in the support state.

4 Claims, 8 Drawing Sheets

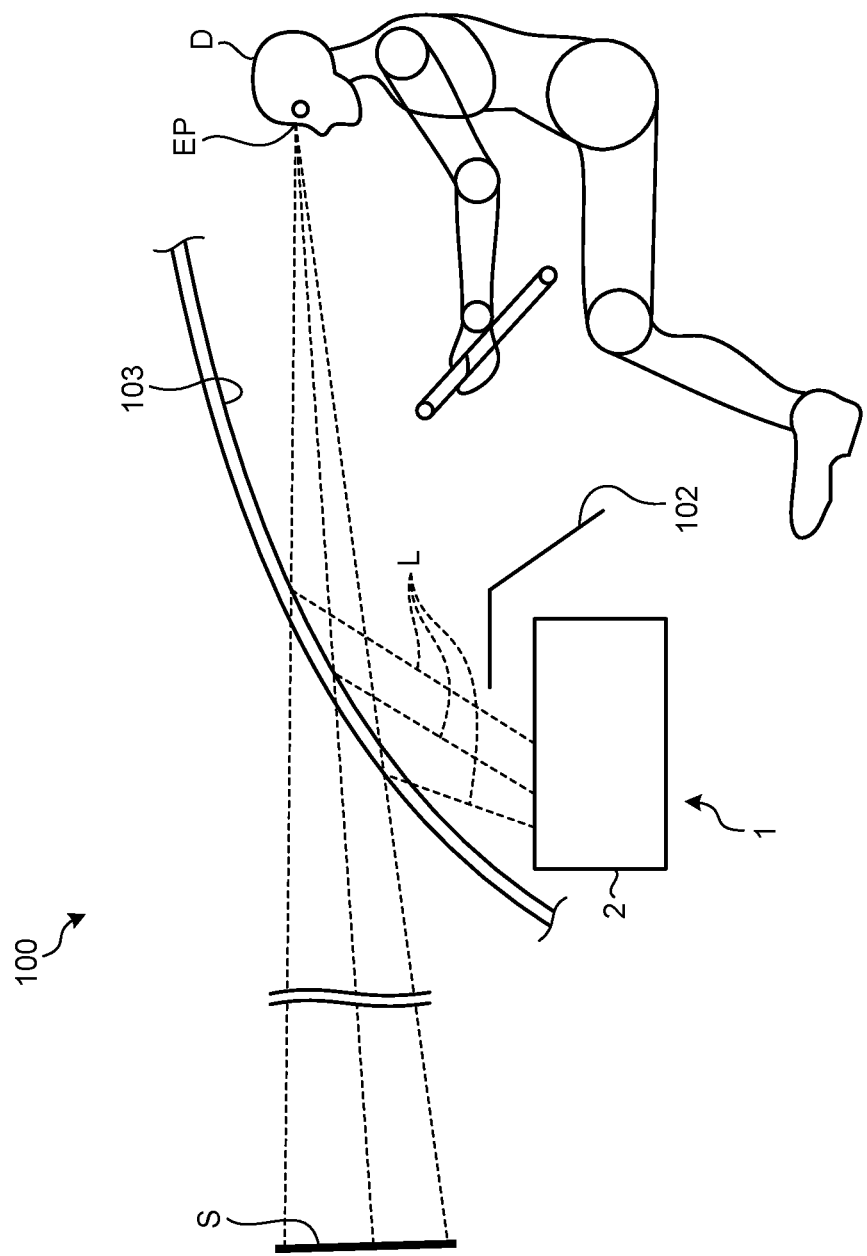

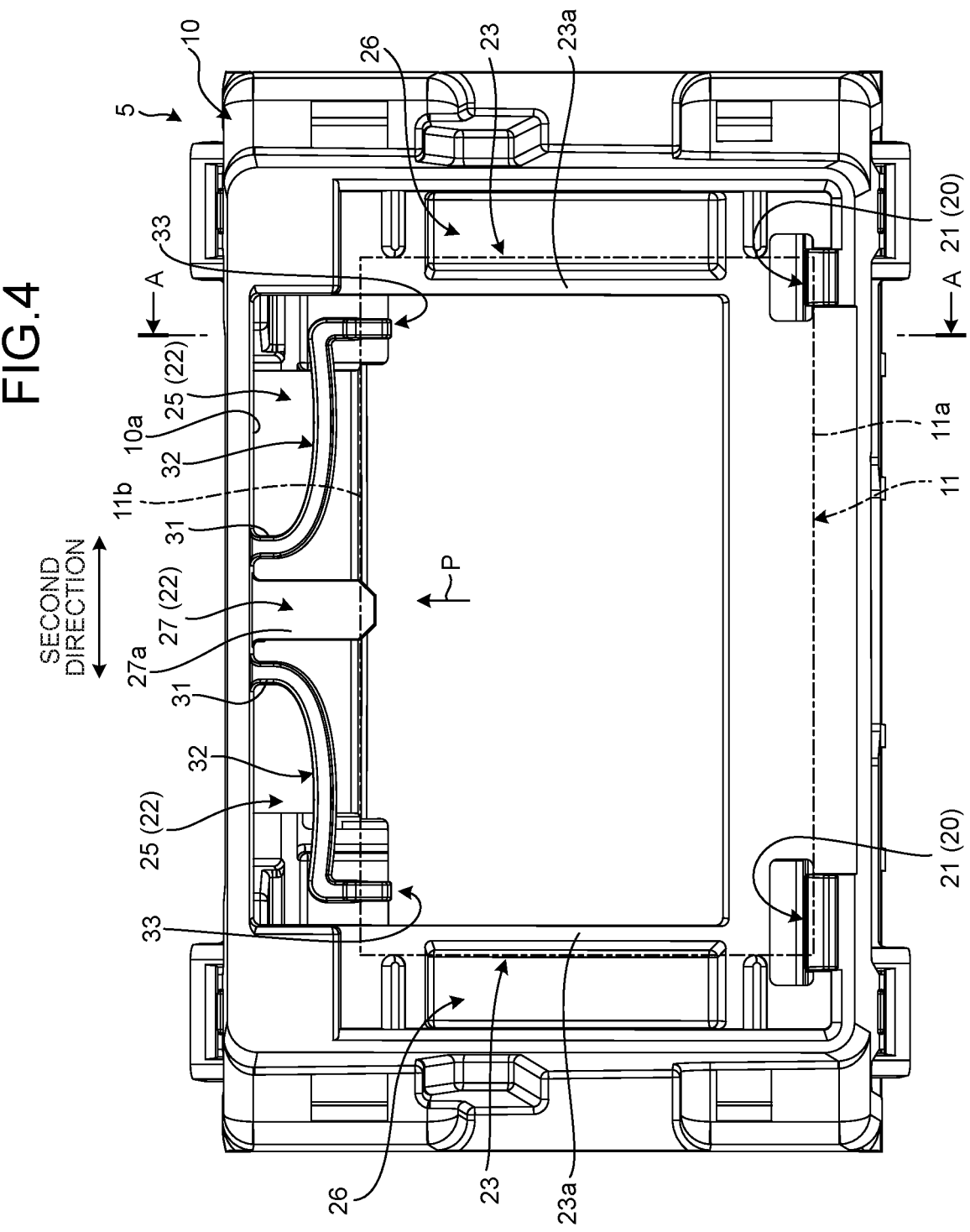

VEHICLE DISPLAY DEVICE

CROSS-REFERENCE TO RELATED APPLICATION(S)

The present application claims priority to and incorporates by reference the entire contents of Japanese Patent Application No. 2021-065142 filed in Japan on Apr. 7, 2021.

BACKGROUND OF THE INVENTION

1. Field of the Invention

The present invention relates to a vehicle display device.

2. Description of the Related Art

In recent years, vehicles such as automobiles are provided with a vehicle display device such as a head-up display (HUD). The vehicle display device, for example, projects a display image, which is to be displayed on a display, onto a windshield, a combiner, or the like via an optical system such as a reflection mirror, thereby causing a driver to visually recognize the display image as a virtual image (for example, Japanese Patent Application Laid-open No. 2018-120807).

In the vehicle display device according to the related art, when a display panel is fixedly assembled to a housing of a display, one end of the display panel is inserted into a recess provided in the housing, and the other end is pushed downward to be caught by a claw portion provided on the housing.

However, when an assembly worker assembles the display panel to the housing, the display panel is pressed downward, so there is room for improvement for the viewpoint of protecting the display panel during the assembly work.

SUMMARY OF THE INVENTION

Therefore, the present invention has been made in view of the above, and an object of the present invention is to provide a vehicle display device capable of substantially preventing a downward pressing force against a display panel when the display panel is assembled to a housing.

In order to solve the above mentioned problem and achieve the object, a vehicle display device according to one aspect of the present invention includes a display that emits a display image as display light to be visually recognized as a virtual image by an occupant of a vehicle, wherein the display includes: a display panel that is formed in a rectangular shape and displays the display image on the basis of light from a light source; and a housing including a locking mechanism that locks the display panel, the locking mechanism includes a first support part that supports a first end at one in a first direction of both ends of the display panel in a plane direction, and a second support part that supports a second end at the other end in the first direction of the display panel in a support state in which the display panel is supported by the first support part, the first support part and the second support part are formed at relatively different positions in an optical axis direction of the display light, the second support part includes a pair of urging portions that urge the display panel toward the first end in the support state, and at least one first receiving portion that is formed protruding from an inner wall of the housing and receives a lower surface of a second end of the display panel in the support state, each of the urging portions is formed curving in an S shape when viewed from the optical axis direction and includes a fixed end portion fixed to the inner wall of the housing, a distal end portion formed at an end opposite to the fixed end portion, and an extending portion extending between the fixed end portion and the distal end portion, and the distal end portion includes an abutting surface that abuts an end surface of the second end of the display panel in the support state, and a second receiving portion that protrudes from the abutting surface toward the display panel and interposes the second end between the second receiving portion and the first receiving portion.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a schematic view illustrating a schematic configuration of a vehicle provided with a vehicle display device according to an embodiment;

FIG. 4 is a plan view illustrating a schematic configuration of the backlight unit according to the embodiment;

DETAILED DESCRIPTION OF THE PREFERRED EMBODIMENTS

Hereinafter, embodiments of a vehicle display device according to the present invention will be described in detail with reference to the drawings. The present invention is not limited by the present embodiment. Furthermore, components in the following embodiment include those that can be easily assumed by a person skilled in the art and those that are substantially the same. Furthermore, components in the following embodiment can be variously omitted, replaced, or changed without departing from the gist of the invention.

EMBODIMENT

Figure 2A:
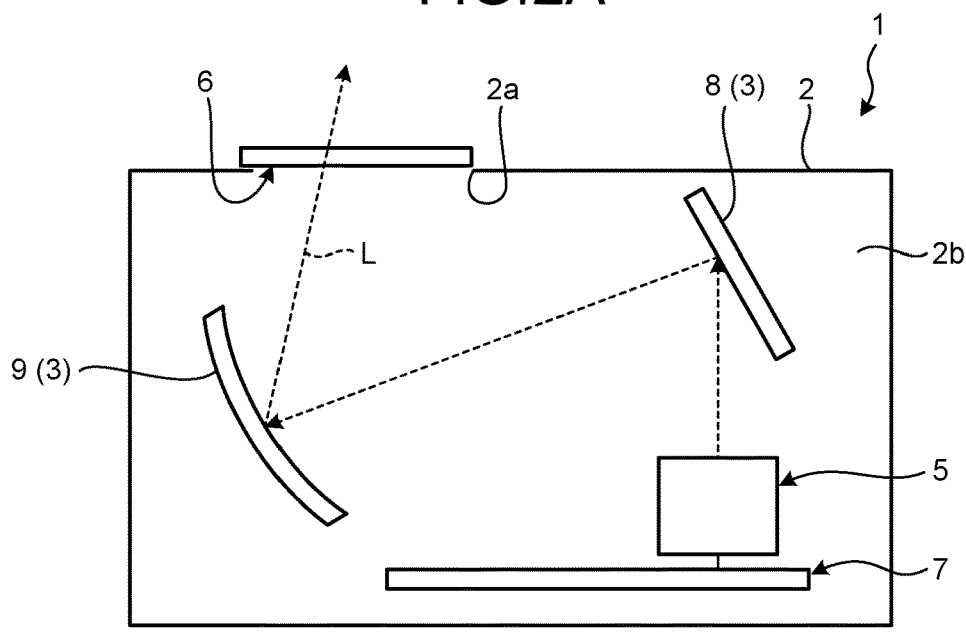
FIG. 2A is a schematic view illustrating a schematic configuration of the vehicle display device according to the embodiment and FIG. 2B is a schematic view illustrating a schematic configuration of a backlight unit according to the embodiment.

As illustrated in FIG. 1, a vehicle display device 1 is, for example, a head-up display device mounted on a vehicle 100 such as an automobile. The vehicle display device 1 is disposed inside an instrument panel 102 in the vehicle 100 and projects a display image onto a windshield 103 that is a projected member. Since the windshield 103 has a semi-transmissive property of reflecting a part of incident light and transmitting the rest, it reflects display light L, which is emitted from the vehicle display device 1, toward an eye point EP of a driver D as a display image while transmitting the foreground of the vehicle 100. The driver D is an occupant of the vehicle 100, particularly, a driver, and recognizes the display image reflected by the windshield 103 as a virtual image S. The virtual image S is recognized in front of the windshield 103 with respect to the driver D. As illustrated in FIG. 2A, the vehicle display device 1 of the present embodiment includes a casing 2, two reflection mirrors 3, a backlight unit 5, and a controller 7.

The casing 2 is formed of, for example, synthetic resin or the like and is fixed to a vehicle body (not illustrated). As illustrated in FIG. 2A, the casing 2 accommodates the backlight unit 5, the two reflection mirrors 3, and the controller 7 in an internal space 2b thereof, and supports them. The casing 2 has an opening 2a that communicates the outside with the internal space 2b. The opening 2a is provided in the casing 2 at a position facing the windshield 103, and is closed by a transparent cover 6. The transparent cover 6 transmits the display light L that is emitted from the backlight unit 5 and reflected by the two reflection mirrors 3. The display light L having transmitted through the transparent cover 6 is directed toward the windshield 103.

The two reflection mirrors 3 are disposed on an optical path of the display light L from the backlight unit 5 to the windshield 103, and reflect the display light L, which is emitted from the backlight unit 5, toward the windshield 103. The two reflection mirrors 3 are composed of a plane mirror 8 and a concave mirror 9.

The plane mirror 8 has a reflection surface formed of a plane and is disposed at a position facing the backlight unit 5. The plane mirror 8 totally reflects the display light L, which is emitted from the backlight unit 5, toward the concave mirror 9 by the reflection surface.

The concave mirror 9 has a reflection surface formed of a concave curved surface and is disposed at a position facing the plane mirror 8. The concave mirror 9 totally reflects the display light L, which is reflected by the plane mirror 8, toward the windshield 103 via the transparent cover 6. The concave mirror 9 has a function as, for example, a magnifying mirror. In order to allow a display image represented by the display light L after being reflected by the concave mirror 9 to be relatively larger than a display image represented by the display light L before being reflected by the concave mirror 9, the concave mirror 9 magnifies and reflects the display image.

Figure 2B:
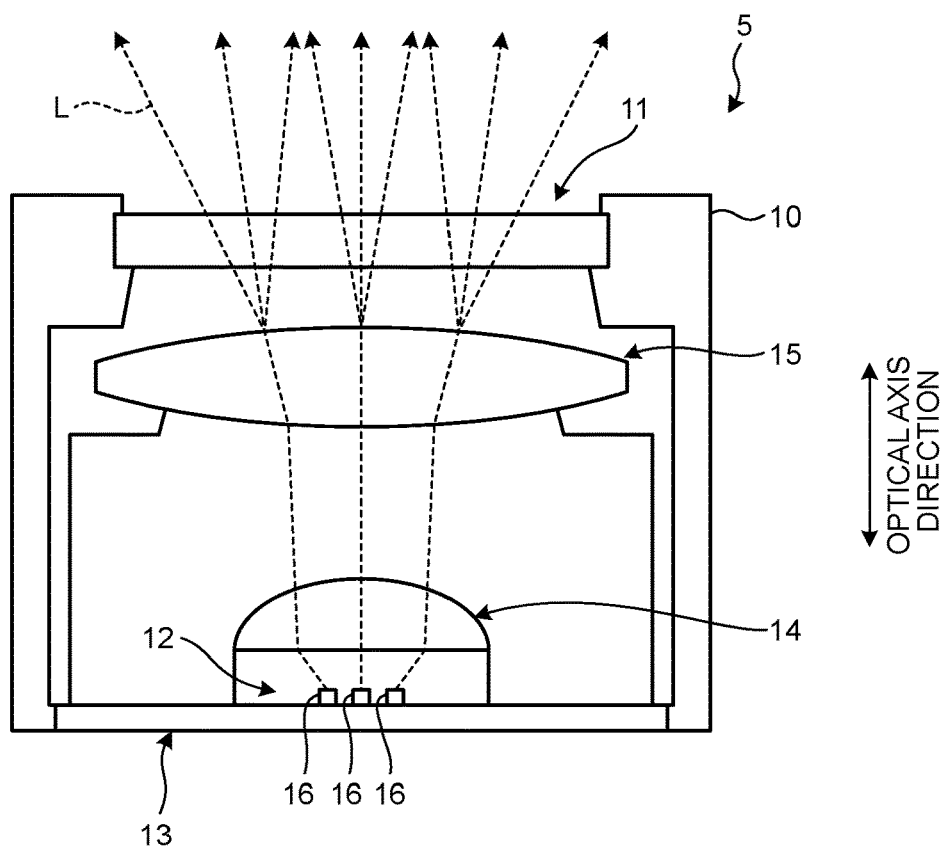

The backlight unit 5 is an example of a display, and emits a display image as the display light L to be visually recognized as the virtual image S by the driver D of the vehicle 100. As illustrated in FIG. 2B, the backlight unit 5 includes a housing 10, a display panel 11, a light source 12, a condensing lens 14, a deflection lens 15, and a locking mechanism 20.

Figure 3:
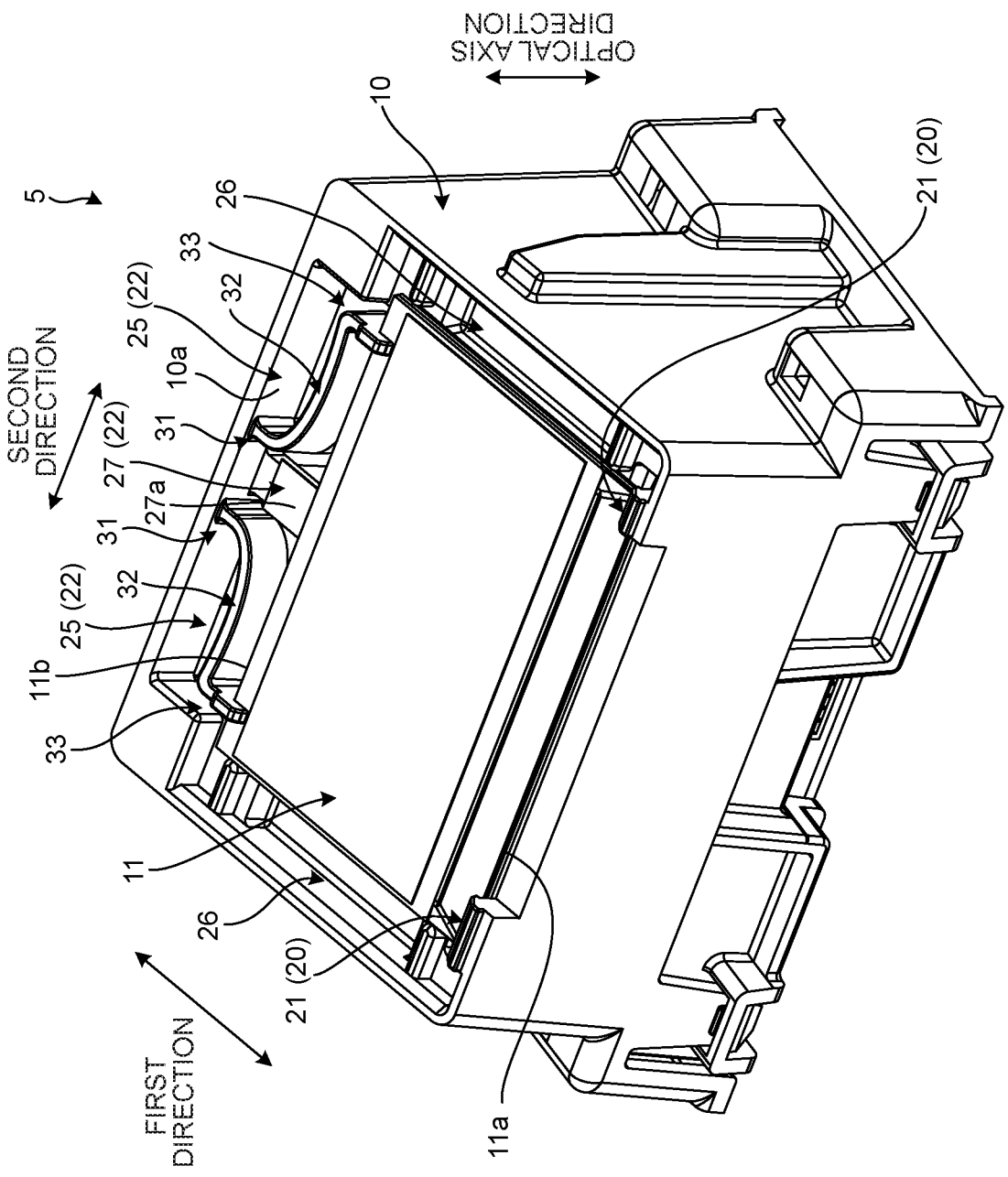
FIG. 3 is a perspective view illustrating the appearance of the backlight unit according to the embodiment.

The housing 10 is formed into a box shape by, for example, synthetic resin or the like, and supports the display panel 11 and the deflection lens 15 along an optical axis direction illustrated in FIG. 2B, for example. The housing 10 has both ends opened in the optical axis direction, wherein one opening is closed by a light source substrate 13 and the other opening is closed by the display panel 11. The housing 10 has the locking mechanism 20 that locks the display panel 11 to the housing 10, and third support parts 23 that support the display panel 11. As illustrated in FIG. 3 and FIG. 4, the locking mechanism 20 has a first support part 21 and a second support part 22.

Figure 7A:
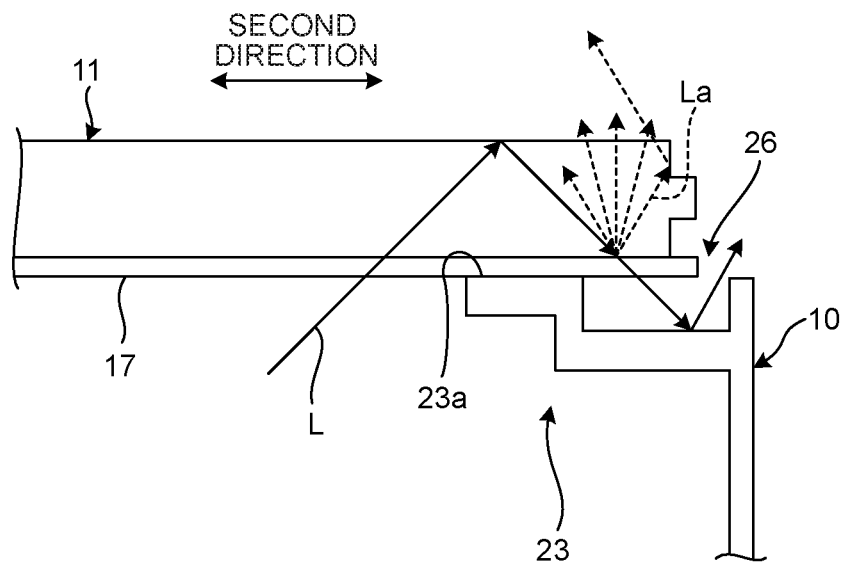
FIG. 7A is a schematic view illustrating a schematic configuration of a reflection prevention structure provided in the backlight unit according to the embodiment and FIG. 7B is a schematic view illustrating an example of a reflection prevention structure provided in a backlight unit according to the related art.

The display panel 11 is formed in a rectangular shape and displays the display image on the basis of light from the light source 12. Specifically, the display panel 11 emits the display image as the display light L to be projected onto the windshield 103 using light incident from the light source 12. The display panel 11 is what is called a liquid crystal panel, and includes a light transmissive type or light semi-transmissive type thin film transistor (TFT) liquid crystal display, or the like. The display panel 11 has a display area (not illustrated) including a plurality of pixels. In the display area, the pixels are arranged in a matrix form. The display panel 11 displays a display image including numbers, characters, figures, or the like in response to a control signal of the controller 7, for example. The display area is an area where the display image is displayed. The display panel 11 is disposed on an optical path of light emitted from the light source 12, and is illuminated from the light source 12 side, so that a display surface on a side opposite to the light source 12 in the optical axis direction emits light. The display panel 11 has a film-shaped diffusion plate 17 attached to a surface on the light source 12 side in a state of being assembled to the housing 10 as illustrated in FIG. 7A.

The light source 12 illuminates the display panel 11. The light source 12 is composed of, for example, one light emitting element mounted on the light source substrate 13. The light emitting element is, for example, a light emitting diode (LED). Furthermore, the light source 12 includes a light source in which a plurality of light emitting elements are mounted in a concentrated manner at a position of the light source substrate 13, where the optical axis of the condensing lens 14 passes, when viewed from the optical axis direction of the condensing lens 14. In such a case, for example, as illustrated in FIG. 2B, one light source 12 is composed of three LEDs 16 mounted in a concentrated manner at the position of the light source substrate 13, where the optical axis of the condensing lens 14 passes. The three LEDs 16 are disposed in a row in a direction orthogonal to the light source direction with respect to the light source substrate 13, for example. The light source 12 is turned on by, for example, electric power obtained from a power source mounted on the vehicle 100, for example, a battery (not illustrated) or the like. The number of LEDs 16 is not limited to three, and may be three or less or four or more.

The condensing lens 14 is disposed on an optical path between the light source 12 and the display panel 11, and condenses light, which is incident from the light source 12, toward the display panel 11. The condensing lens 14 is disposed between the light source 12 and the deflection lens 15 on the optical path between the light source 12 and the display panel 11. The condensing lens 14 is formed of, for example, a high refractive index material such as glass or transparent resin, and functions to inwardly refract light directed to the outside and condense the refracted light on the deflection lens 15.

The deflection lens 15 is disposed between the condensing lens 14 and the display panel 11 on the optical path between the light source 12 and the display panel 11, and deflects the light, which is condensed by the condensing lens 14, toward the display panel 11. The deflection lens 15 is formed of, for example, a material such as glass or transparent resin, and refracts and deflects the light toward the display area of the display panel 11. The deflection lens 15 is fixed to the housing 10 by a screw or the like. As illustrated in FIG. 4

(B), the deflection lens 15 is formed in a rectangular shape when viewed from the optical axis direction.

As illustrated in FIG. 2A, the controller 7 is connected to the backlight unit 5 and controls the backlight unit 5. The controller 7 is composed of, for example, an IC chip and the like mounted on a substrate, and is driven by electric power obtained from a battery mounted on the vehicle 100.

Figure 5A:
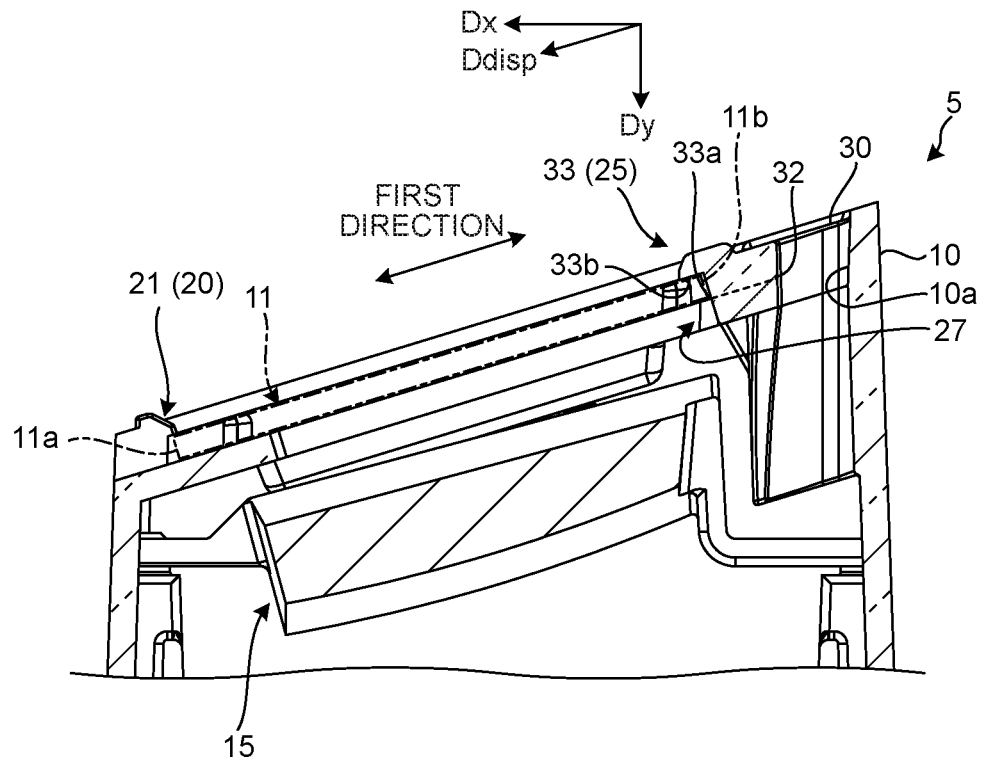
FIG. 5A is a partial cross-sectional view illustrating a schematic configuration of the backlight unit according to the embodiment and FIG. 5B is a partially enlarged view illustrating a schematic configuration of the backlight unit.

The first support part 21 supports a first end 11a at one in a first direction of both ends of the display panel 11 in a plane direction. As illustrated in FIG. 5A, the first support part 21 has a cross-sectional shape formed in a C shape or a concave shape when viewed from a second direction orthogonal to the first direction, and accommodates and supports the first end 11a of the display panel 11 inside. Furthermore, the first support part 21 is formed at a position on one end side in the first direction when the housing 10 is viewed from the second direction, the position facing the second support part 22 in the first direction. The first support part 21 is formed at both ends of the first end 11a of the display panel 11 in the second direction when viewed from the optical axis direction, for example.

The second support part 22 supports a second end 11b at the other end in the first direction of the display panel 11 in the support state in which the display panel 11 is supported by the first support part 21. As illustrated in FIG. 5A, the first support part 21 and the second support part 22 are formed at relatively different positions in the housing 10 in the optical axis direction of the display light L. For example, the second support part 22 is formed on the light source 12 side in the optical axis direction with respect to the first support part 21. The display panel 11 is fixedly supported at a certain inclination angle by the positional relationship between the first support part 21 and the second support part 22. An angle between the first direction and the horizontal direction of the display panel 11 is defined as, for example, a disposition angle of the display panel 11. In FIG. 5A, direction Dx denotes a horizontal direction, direction Dy denotes a downward direction, and direction Ddisp denotes a disposition angle direction of the display panel 11. The second support part 22 has a pair of urging portions 25 and a first receiving portion 27.

Figure 5B:
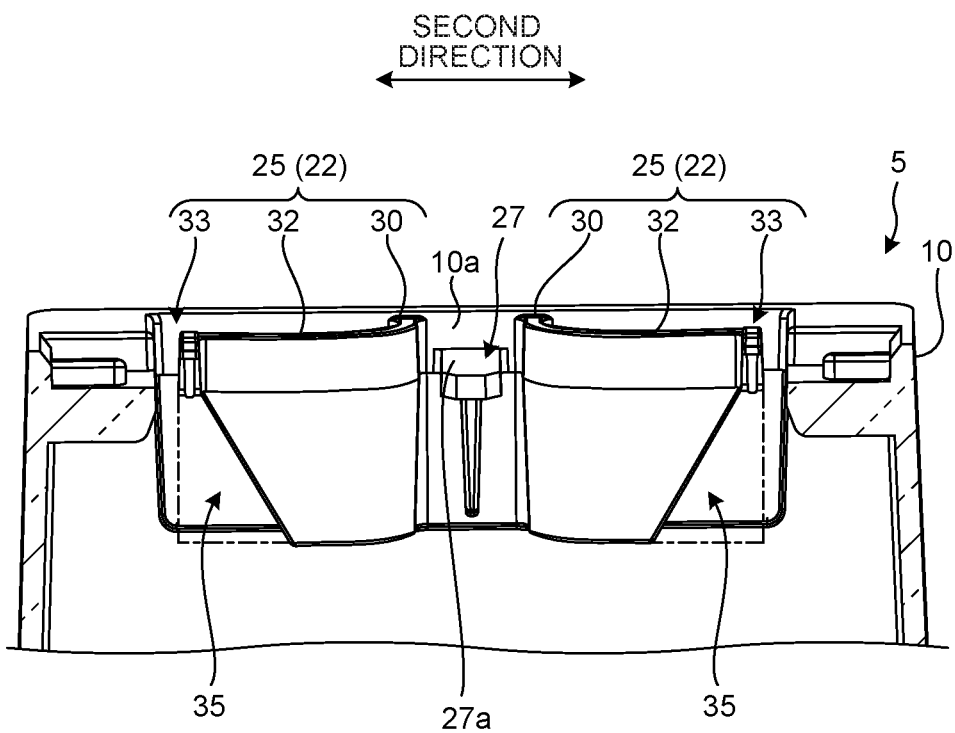

Each of the pair of urging portions 25 urges the display panel 11 toward the first end 11a in the support state in which the display panel 11 is supported by the first support part 21 and the second support part 22. As illustrated in FIG. 5A and FIG. 5B, the pair of urging portions 25 are located on an inner wall 10a on the other side in the first direction among the inner walls 10a of the housing 10, and are separately formed on the left and right sides of the first receiving portion 27 when viewed from the direction of arrow P in FIG. 4 in the first direction. As illustrated in FIG. 4, each of the urging portions 25 is formed curving in an S shape when viewed from the optical axis direction, and has springiness (elasticity) in the first direction. When it is not the support state, one end of each of the urging portions 25 serves as a fixed end fixed to the inner wall 10a of the housing 10, and the other end thereof serves as a free end. Each of the urging portions 25 has a fixed end portion 31, an extending portion 32, and a distal end portion 33.

The first receiving portion 27 is formed protruding from the inner wall 10a of the housing 10, and receives a lower surface of the second end 11b of the display panel 11 in the support state. The first receiving portion 27 is formed protruding from the inner wall 10a, on which the pair of urging portions 25 are provided among the inner walls 10a of the housing 10, toward the first support part 21, and is disposed between the two urging portions 25. The first receiving portion 27 has a placing surface 27a on which the display panel 11 is placed in an up and down direction orthogonal to the first direction and the second direction of the display panel 11 in the support state in which the display panel 11 is supported by the first support part 21 and the second support part 22. The up and down direction is an up and down direction for convenience, and is not necessarily a vertical direction. Furthermore, in the present embodiment, the up and down direction is along the optical axis direction, but is not limited thereto.

The fixed end portion 31 is a fixed end in each of the urging portions 25, and is a portion fixed to the inner wall 10a on the same surface among the inner walls 10a of the housing 10. The fixed end portion 31 is disposed on a side of the inner wall 10a, which faces the first receiving portion 27, in the second direction, and is formed extending along the up and down direction of the inner wall 10a. Particularly, the fixed end portion 31 is formed extending toward the light source 12 from the first receiving portion 27 in the up and down direction.

The extending portion 32 is a portion of each of the urging portions 25, which extends between the fixed end portion 31 and the distal end portion 33. The extending portion 32 extends from the fixed end portion 31 toward an end of the display panel 11 in the second direction, and is formed extending along the up and down direction of the inner wall 10a. Particularly, the extending portion 32 is formed extending toward the light source 12 from the first receiving portion 27 in the up and down direction.

Figure 8:
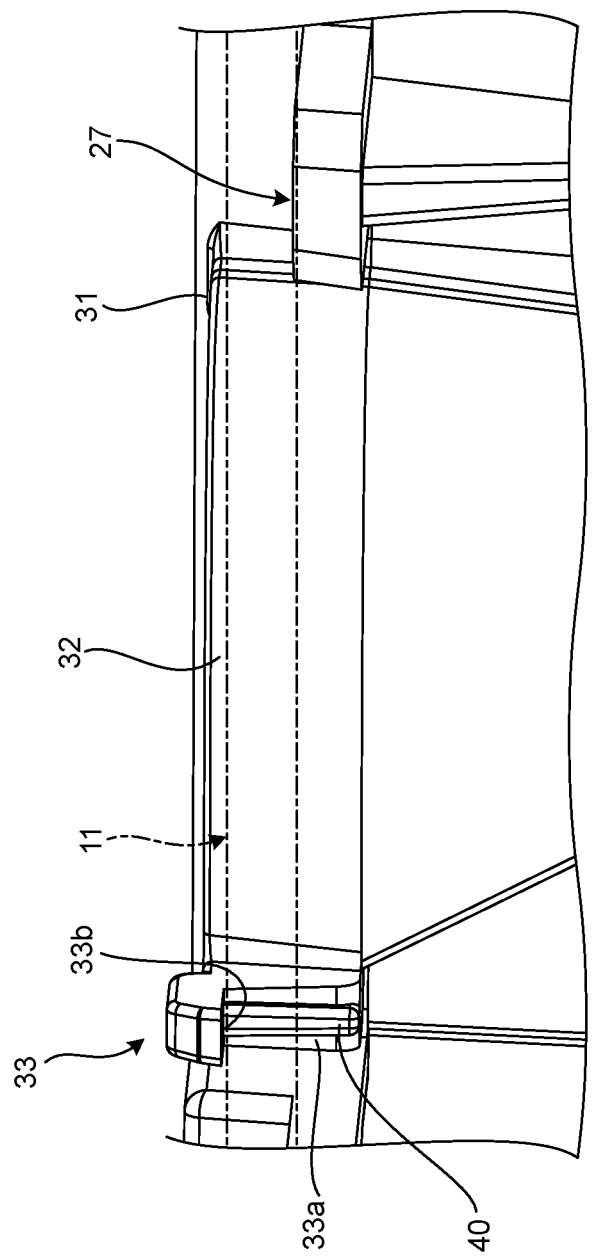
FIG. 8 is a partially enlarged view illustrating a schematic configuration of a distal end according to the embodiment.

The distal end portion 33 is a free end in each of the urging portions 25, and is a portion formed at an end opposite to the fixed end portion 31. The distal end portion 33 has an abutting surface 33a and a second receiving portion 33b. The abutting surface 33a has, for example, a planar shape, and is a portion that abuts the end surface of the second end 11b of the display panel 11 in the above support state. The second receiving portion 33b is a portion that protrudes from the abutting surface 33a toward the display panel 11 and interposes the second end 11b of the display panel 11 between the second receiving portion 33b and the first receiving portion 27. The second receiving portion 33b has a contact surface that comes into contact with the second end 11b of the display panel 11 in the above support state, and interposes the second end 11b between the contact surface and the placing surface 27a of the first receiving portion 27. Consequently, in the above support state, the second end 11b of the display panel 11 is supported by the second receiving portion 33b at two points from above, and is supported by the first receiving portion 27 at one point from below. As illustrated in FIG. 8, the abutting surface 33a has a protrusion 40 formed protruding toward the first support part 21 and extend in the up and down direction. The abutting surface 33a may be formed in a flat surface without the protrusion 40.

Figure 6:
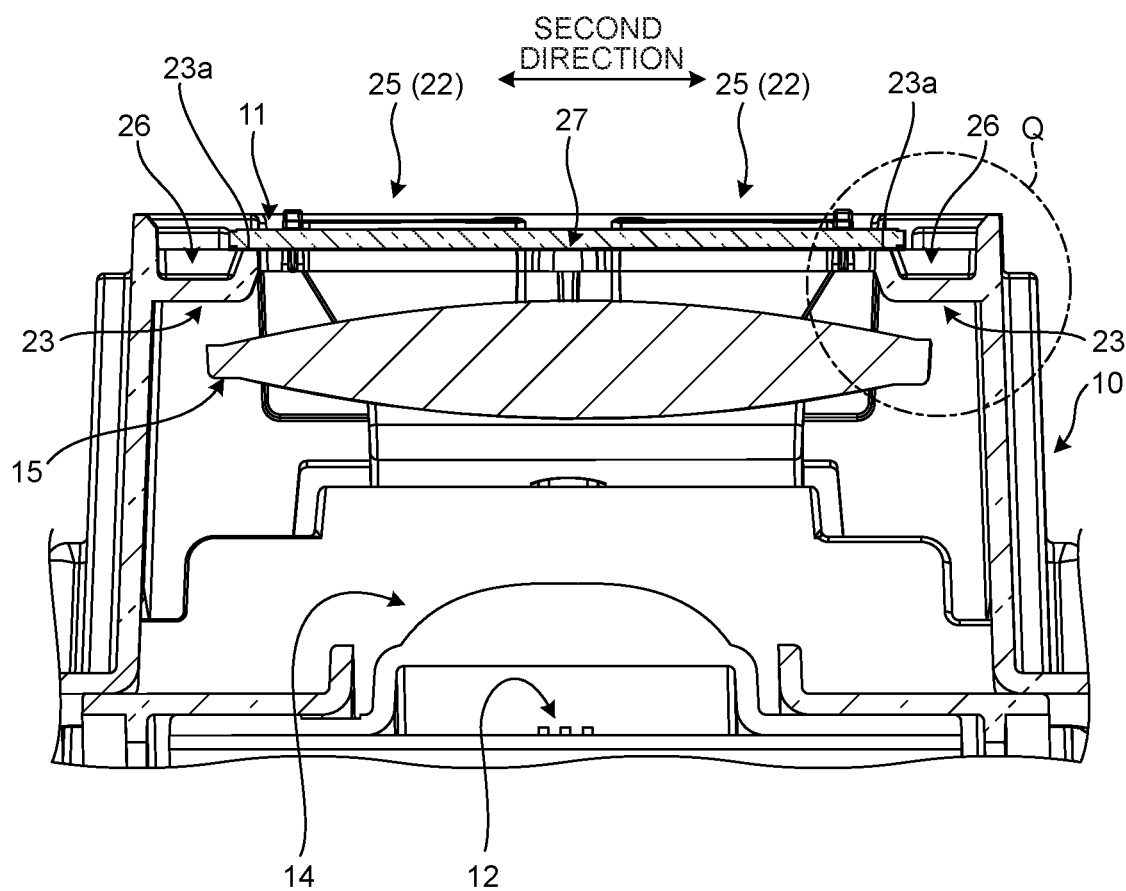
FIG. 6 is a cross-sectional view illustrating a schematic configuration of the backlight unit according to the embodiment.

As illustrated in FIG. 3, FIG. 4, and FIG. 6, the third support parts 23 support both ends of the display panel 11 in the second direction, respectively. The third support parts 23 each have a placing surface 23a on which the display panel 11 is placed in the up and down direction in a state in which the display panel 11 is supported by the third support parts 23. The placing surface 23a has a groove 26 formed extending in the first direction at a position facing an end on the second direction side of the display panel 11 in the up and down direction.

The groove 26 is formed in rectangular shape having a short side in the second direction when viewed from the up and down direction. A portion of the housing 10 used for forming the groove 26 is formed of a synthetic resin material that does not transmit light, like the other portions of the housing 10. The groove 26 is formed up to the outside of the end on the second direction side of the display panel 11 when viewed from the extending direction of the groove 26, and is opened to the outside. The extending direction is along the first direction. FIG. 7A is a schematic view illustrating a schematic configuration of a reflection prevention structure provided in the backlight unit 5, and is an enlarged view of a portion Q in FIG. 6. The third support parts 23 support the display panel 11 in a state in which the display panel 11 is placed on the placing surface 23a via the diffusion plate 17.

Next, a virtual image display operation in the vehicle display device 1 will be described with reference to FIG. 1, FIG. 2A, and FIG. 2B. First, light emitted from the light source 12 passes through the condensing lens 14, and is emitted toward the deflection lens 15. The emitted light is refracted by the condensing lens 14, and is condensed by the deflection lens 15. The light incident on the deflection lens 15 passes through the inside, is refracted by the deflection lens 15, and is emitted toward the display panel 11. The display panel 11 emits the display image as the display light L, which is displayed in the display area, using the light having passed through the inside.

The display light L emitted from the display panel 11 of the backlight unit 5 is directed toward the plane mirror 8. The plane mirror 8 reflects the display light L incident from the backlight unit 5 toward the concave mirror 9. The concave mirror 9 reflects the display light L incident from the plane mirror 8 toward the windshield 103 via the transparent cover 6 by the concave reflection surface. With this, the display image corresponding to the display light L is projected onto the windshield 103, so that the virtual image S is displayed in front of the eye point EP of the driver D.

Next, an assembly work of assembling the display panel 11 to the housing 10 will be described. An assembly worker temporarily pushes each of the urging portions 25 toward the inner wall 10a in the housing 10. Thereafter, the assembly worker drops the second end 11b toward the second support part 22 while inserting the first end 11a of the display panel 11 into the recess of the first support part 21 of the housing 10. At this time, the assembly worker places each end of the display panel 11 in the second direction on the placing surface 23a of each of the third support parts 23, and places the second end 11b on the placing surface 27a of the first receiving portion 27. The assembly worker assembles the display panel 11 to the housing 10 while bringing the abutting surface 33a and the second receiving portion 33b of the distal end portion 33 into contact with the second end 11b of the display panel 11. With this, an urging force generated by each of the urging portions 25 is applied to the display panel 11, so that the display panel 11 is fixed to the housing 10.

In the vehicle display device 1 of the present embodiment, the locking mechanism 20 has the first support part 21 that supports the first end 11a of the display panel 11, and the second support part 22 provided on an opposite side of the first support part 21 in the first direction and located at a position relatively different from the first support part 21 in the optical axis direction. The second support part 22 has the pair of urging portions 25 that urge the display panel 11 toward the first end 11a in a support state, and the first receiving portion 27 that receives the lower surface of the second end 11b of the display panel 11 in the support state. Each of the urging portions 25 is formed curving in an S shape when viewed from the optical axis direction, and has the fixed end portion 31, the distal end portion 33 formed at an end opposite to the fixed end portion 31, and the extending portion 32 that extends between the fixed end portion 31 and the distal end portion 33. The distal end portion 33 has the second receiving portion 33b that protrudes from the abutting surface 33a toward the display panel 11 and interposes the second end 11b of the display panel 11 between the second receiving portion 33b and the first receiving portion 27 in the support state.

With the above configuration, during the assembly work, the distal end portion 33 of each of the urging portions 25 is pushed to the opposite side of the display panel 11 to place the display panel 11 on the housing 10, and the distal end portion 33 urges the display panel 11 toward the first support part 21 by the urging force of the urging portions 25. With this, the force for pressing the display panel 11 in the downward direction (Dy direction) can be set to the disposition angle direction (Ddisp) of the display panel 11, so that it is possible to assemble the display panel 11 to the housing 10. As a consequence, it is possible to substantially prevent the force for pressing the display panel 11 in the downward direction, in order to assemble the display panel 11 to the housing 10.

The vehicle display device 1 of the present embodiment has the groove 26 in the placing surface 23a in a state in which the display panel 11 is supported by the third support parts 23, the groove 26 being formed extending in the first direction at a position facing an end on the second direction side of the display panel 11 in the up and down direction. The groove 26 is formed up to the outside of the end on the second direction side of the display panel 11 when viewed from the extending direction of the groove 26, and is opened to the outside.

Figure 7B:
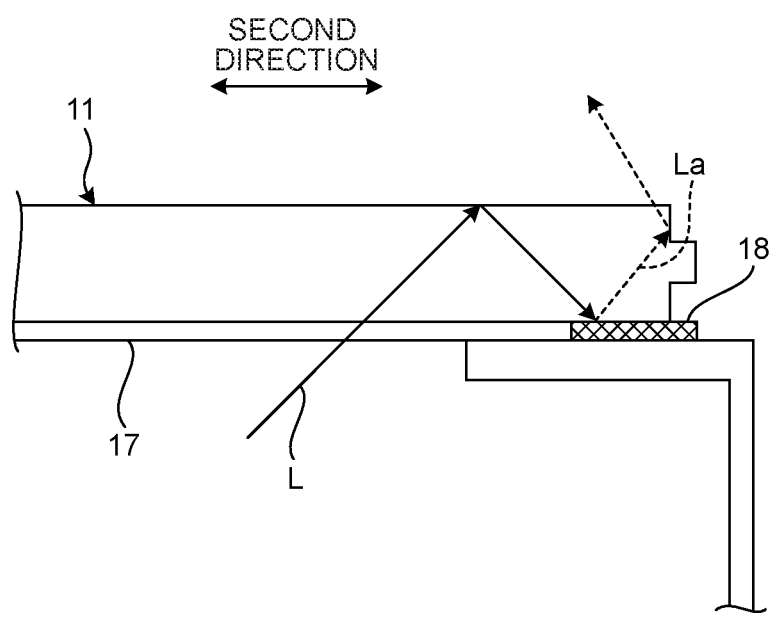

In the related art, light L reflected inside the display panel 11 is reflected when abutting on the diffusion plate 17, and is reflected outward by an inner end surface of an end of the display panel 11, so that unintended light La is included in the virtual image S, which may reduce the visibility of the virtual image S. Therefore, as illustrated in FIG. 7B, black printing, black tape, or the like (black portion 18) are applied to an end of the film-shaped diffusion plate 17 attached to the surface of the display panel 11 on the light source 12 side. However, since it is an additional process for the diffusion plate 17, there is room for improvement in terms of production and cost. With the above configuration, a part of the light La reflected inside the display panel 11 is diffused by the diffusion plate 17, but the rest is incident on the groove 26 by passing through the diffusion plate 17, is reflected by the groove 26, and then is led to the outside via an opening. As a consequence, it is possible to reduce the light La reflected by the inner end surface of the display panel 11 and substantially prevent the reduction of the visibility of the virtual image S without providing the black portion 18 on the diffusion plate 17. Since the light La diffused by the diffusion plate 17 has low luminance, even though it is reflected outward by the inner end surface of the end of the display panel 11, the visibility of the virtual image S is not reduced.

In the vehicle display device 1 of the present embodiment, in each of the urging portions 25, the fixed end portion 31 and the extending portion 32 are formed extending toward the light source 12 in the up and down direction from the first receiving portion 27, and the distal end portion 33 has a notch 35 formed on the light source 12 side in the up and down direction from the first receiving portion 27. With this, when the display panel 11 is fixedly locked to the housing 10 by the locking mechanism 20, tension and stress for pressing the display panel 11 can be prevented from being concentrated on the urging portions 25.

In the vehicle display device 1 of the present embodiment, the second end 11b of the display panel 11 is supported by the second receiving portion 33b at two points from above, and is supported by the first receiving portion 27 at one point from below in the above support state. With this, the length from the fixed end portion 31 to the distal end portion 33 in each of the urging portions 25 can be secured, and the second end 11b can be supported to be interposed between two points separated in the second direction and one central point between the two points, which makes it possible to efficiently and stably hold the display panel 11.

In the above embodiment, the backlight unit 5 is a liquid crystal system, but may be another system, for example, a laser system, a digital light processing (DLP) system, or a projector system.

Furthermore, in the above embodiment, one first receiving portion 27 is formed on the inner wall 10a of the housing 10, but a plurality of first receiving portion 27 may be formed along the second direction.

Furthermore, in the above embodiment, the controller 7 may be connected to an electronic controller (ECU) (not illustrated) mounted on the vehicle 100, and transmit/receive signals to/from the ECU.

Furthermore, in the above embodiment, the vehicle display device 1 has, but is not limited to, two reflection mirrors 3. For example, the vehicle display device 1 may have one reflection mirror 3 (concave mirror 9). Furthermore, the vehicle display device 1 may have three or more reflection mirrors 3. The plane mirror 8 may be a concave mirror, or may be, for example, a convex mirror, an aspherical mirror, a spherical mirror, a free curved mirror, or the like. The concave mirror 9 may be, for example, a convex mirror, an aspherical mirror, a spherical mirror, or a free curved mirror. Furthermore, the concave mirror 9 has a function as a magnifying mirror, but is not limited to, and may have a function as a correction mirror.

Furthermore, in the above embodiment, the vehicle display device 1 projects a display image onto the windshield 103 of the vehicle 100, but is not limited to, and may project a display image onto, for example, a combiner or the like.

Furthermore, in the above embodiment, the vehicle display device 1 is applied to the vehicle 100 such as an automobile, but is not limited to, and may be applied to, for example, a ship, an aircraft, or the like other than the vehicle 100.

The vehicle display device according to the present embodiment is capable of substantially preventing a downward pressing force against a display panel when the display panel is assembled to a housing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
   a display that emits a display image as display light to be visually recognized as a virtual image by an occupant of a vehicle, wherein
   the display includes:
      a display panel that is formed in a rectangular shape and displays the display image on the basis of light from a light source; and
      a housing including a locking mechanism that locks the display panel,
   the locking mechanism includes a first support part that supports a first end at one in a first direction of both ends of the display panel in a plane direction, and a second support part that supports a second end at the other end in the first direction of the display panel in a support state in which the display panel is supported by the first support part,
   the first support part and the second support part are formed at relatively different positions in an optical axis direction of the display light,
   the second support part includes a pair of urging portions that urge the display panel toward the first end in the support state, and at least one first receiving portion that is formed protruding from an inner wall of the housing and receives a lower surface of a second end of the display panel in the support state,
   each of the urging portions is formed curving in an S shape when viewed from the optical axis direction and includes a fixed end portion fixed to the inner wall of the housing, a distal end portion formed at an end opposite to the fixed end portion, and an extending portion extending between the fixed end portion and the distal end portion, and
   the distal end portion includes an abutting surface that abuts an end surface of the second end of the display panel in the support state, and a second receiving portion that protrudes from the abutting surface toward the display panel and interposes the second end between the second receiving portion and the first receiving portion.

2. The vehicle display device according to claim 1, wherein
   the housing includes third support parts that support both ends of the display panel in a second direction orthogonal to the first direction in the plane direction,
   each of the third support parts includes a groove in a placing surface on which the display panel is placed in an up and down direction orthogonal to the first direction and the second direction in a state in which the display panel is supported by the third support parts, the groove being formed extending in the first direction at a position facing an end on a side in the second direction of the display panel in the up and down direction, and
   the groove is formed up to an outside of the end on the side in the second direction of the display panel when viewed from an extending direction of the groove, and is opened to the outside.

3. The vehicle display device according to claim 1, wherein,
   in each of the urging portions, the fixed end portion and the extending portion are formed extending toward the light source in the up and down direction from the first receiving portion, and the distal end portion includes a notch formed on a side of the light source in the up and down direction from the first receiving portion.

4. The vehicle display device according to claim 2, wherein,
   in each of the urging portions, the fixed end portion and the extending portion are formed extending toward the light source in the up and down direction from the first receiving portion, and the distal end portion includes a notch formed on a side of the light source in the up and down direction from the first receiving portion.

\* \* \* \* \*